United States Patent
Bijlani et al.

(10) Patent No.: US 11,212,170 B1
(45) Date of Patent: Dec. 28, 2021

(54) SERVICE PROVIDER NETWORK APPLICATION TESTING WITH STANDARDS REFERENCES

(71) Applicant: T-Mobile USA, Inc., Bellevue, WA (US)

(72) Inventors: Sharmeelee Bijlani, Bellevue, WA (US); Arnold Cataniag, Issaquah, WA (US); Madhuri Kotta, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/074,554

(22) Filed: Oct. 19, 2020

(51) Int. Cl.
*H04L 12/24* (2006.01)
*H04L 29/06* (2006.01)
*H04L 29/08* (2006.01)
*G06F 11/36* (2006.01)
*H04L 12/26* (2006.01)

(52) U.S. Cl.
CPC ...... *H04L 41/0806* (2013.01); *G06F 11/3636* (2013.01); *H04L 41/0869* (2013.01); *H04L 41/0886* (2013.01); *H04L 43/18* (2013.01); *H04L 63/0263* (2013.01); *H04L 67/303* (2013.01)

(58) Field of Classification Search
CPC ......... H04L 41/0654–0695; H04L 41/08–082; H04L 41/0866–0873; H04L 41/0876–0893; H04L 41/5041–5054; H04L 43/10; H04L 43/18; H04L 43/50; G06F 11/36–3696
See application file for complete search history.

(56) References Cited

U.S. PATENT DOCUMENTS

| | | |
|---|---|---|
| 8,014,767 B1 | 9/2011 | Spitz et al. |
| 8,040,798 B2 | 10/2011 | Chandra et al. |
| 8,499,331 B1 * | 7/2013 | Yehuda ............... H04L 41/5009 726/1 |
| 9,032,477 B2 | 5/2015 | Ranjan et al. |
| 9,454,351 B2 | 9/2016 | Anderson et al. |
| 9,787,800 B2 | 10/2017 | e Costa et al. |
| 9,830,141 B2 | 11/2017 | Cairns et al. |
| 9,841,981 B2 * | 12/2017 | Dimitrakos ........... G06F 9/5077 |
| 10,216,509 B2 | 2/2019 | Martin Vicente et al. |
| 10,223,658 B2 | 3/2019 | Cornilescu |

(Continued)

*Primary Examiner* — Brendan Y Higa
(74) *Attorney, Agent, or Firm* — Lee & Hayes, P.C.

(57) ABSTRACT

A service provider network including one or more network nodes such as an integration and continuous deployment (CI/CD) node is described herein. The CI/CD node may determine whether a candidate application from a third-party application vendor satisfies one or more onboarding rules of the service provider network. The CI/CD node may identify a message from the candidate application by running one or more node traces based on a call identifier associated with the candidate application. A first portion of the message (e.g., alphanumeric symbols of the header) may be compared to a first string from a particular network standard (e.g., from a publicly available database) and/or a second portion of the message (e.g., a characteristic of the body) may be compared to a second string or a second onboarding rule (e.g., comprising a particular network operator standard) to detect a difference indicating noncompliance with the one or more onboarding rules.

20 Claims, 5 Drawing Sheets

300

(56) References Cited

U.S. PATENT DOCUMENTS

| | | | |
|---|---|---|---|
| 10,303,586 B1 | 5/2019 | Falko | |
| 10,310,969 B2 | 6/2019 | Bhattacharjee et al. | |
| 10,404,730 B1 | 9/2019 | Venable, Sr. | |
| 10,517,011 B2 | 12/2019 | Mondal et al. | |
| 10,528,458 B2 | 1/2020 | Blafmnan et al. | |
| 10,713,664 B1 * | 7/2020 | Alagappan | G06F 40/205 |
| 10,872,029 B1 * | 12/2020 | Bawcom | G06F 21/577 |
| 2016/0373289 A1 * | 12/2016 | Hernandez | H04L 41/16 |
| 2018/0013657 A1 * | 1/2018 | Cantwell | H04L 43/50 |
| 2018/0341473 A1 * | 11/2018 | Watt, Jr. | G06Q 50/18 |
| 2021/0081271 A1 * | 3/2021 | Doshi | G06F 11/0793 |

* cited by examiner

SERVICE PROVIDER NETWORK APPLICATION TESTING WITH STANDARDS REFERENCES

BACKGROUND

Validation procedures for deploying new applications onto networks (e.g., 3rd Generation Partnership Program (3GPP) networks) must ensure compliance with many network standards. As service providers have updated their networks through various iterations (e.g., 3G, 4G, and LTE), added inter-operability with other service provider networks, and added new services, there is often a complex web of network standards for which achieving compliance for every application can be difficult.

Moreover, conventional validation procedures for telecommunications network software often only address noncompliance by troubleshooting failure scenarios. Troubleshooting failure scenarios can be a time and resource intensive process because many manual traces must be run to detect the sources of the error. Additionally, during conventional compliance testing, there is typically no way to differentiate a noncompliant message (e.g., indicating trouble) from a validly compliant message that merely seems noncompliant because it has been customized for a particular operator. As such, customized messages are sometimes mistaken for noncompliant messages.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Systems, methods, and apparatuses (hereinafter the "system") disclosed herein may comprise a service provider network including one or more network nodes such as an integration and continuous deployment (CI/CD) node. The CI/CD node may determine whether a candidate application provided by a third-party application vendor satisfies one or more onboarding rules of the service provider network and, accordingly, whether the candidate application passes or fails a test procedure.

In some examples, the service provider network may receive the candidate application from a third-party application vendor and may determine a call identifier associated with the candidate application. The CI/CD node may identify a message from the candidate application by running one or more node traces based on the call identifier. A first portion of the message (e.g., alphanumeric symbol(s) of a header) may be compared to a first string from a particular network standard (e.g., from a publicly available database) and/or a second portion of the message (e.g., a portion or characteristic of the body) may be compared to a second string or a second onboarding rule comprising a particular network operator standard (e.g., stored at a service provider network database requiring a security-credential) to determine an existence of a difference between the message and the one or more onboarding rules indicating noncompliance with the one or more onboarding rules and network standards.

In some examples, the system may identify anomalous tests such as tests that operate incorrectly, messages that increase a likelihood of a file change that will cause a test failure, and/or log messages associated with build failures. In some instances, the system may improve upon conventional processes by automating validation and compliance procedures that were previously performed manually within a CI/CD pipeline.

In some examples, the system may provide an improved validation process by creating an automatic workflow that includes creating a working onboarding rules database based directly on specifications within Global System for Mobile Communications Association (GSMA) references, and then checking messages in an application output log/database generated by a node or network under test against the onboarding rule. Differences between the messages versus the onboarding rule may be flagged to show noncompliance issues in the workflow, particularly during update cycles. The system may use this comparison of logs to accept or reject software, and/or request changes to the software. The system may also determine whether test messages contain information mandatory to the reference standards, versus messages that have been customized for specific third-party application vendors.

Figure 1:
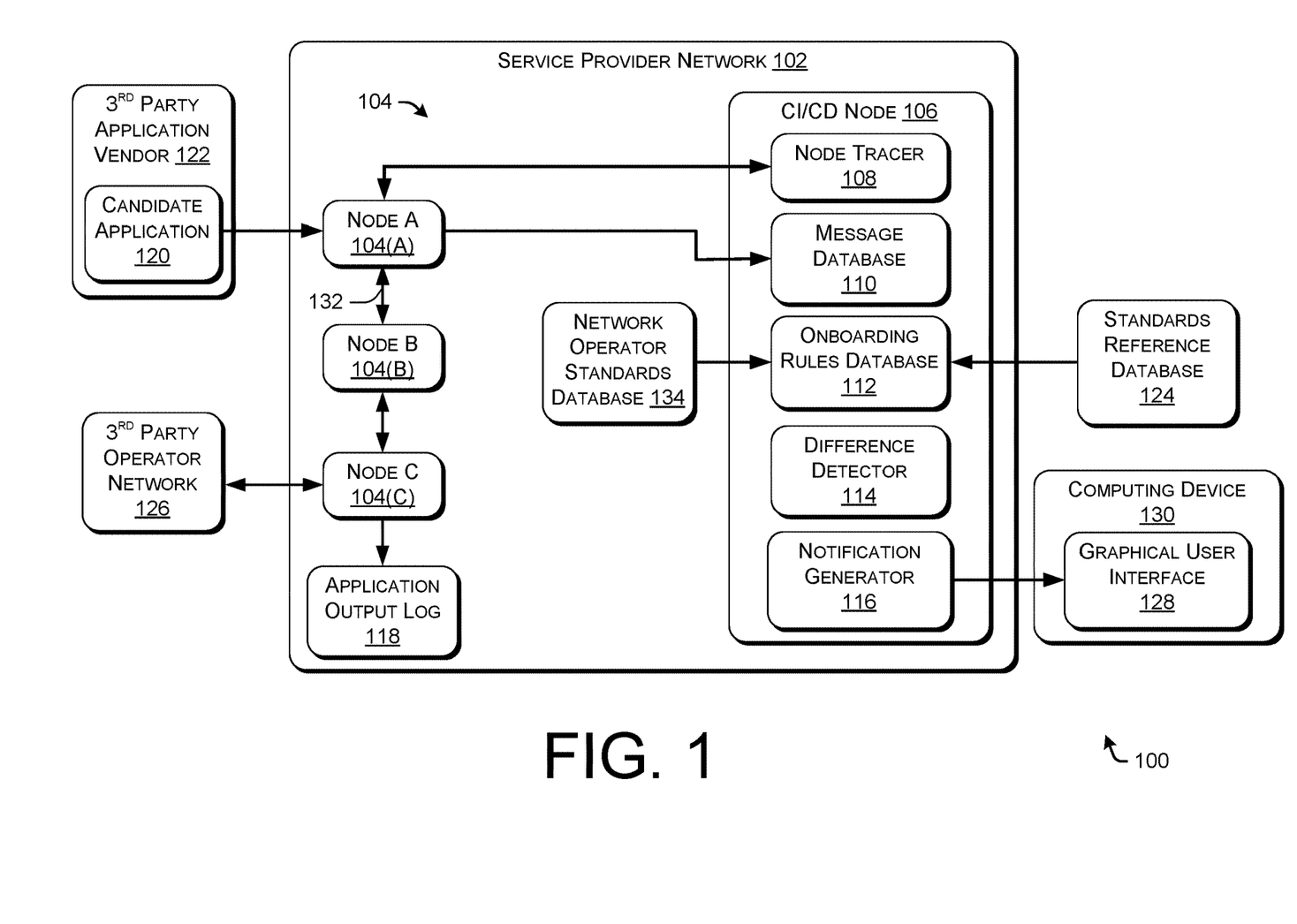
FIG. 1 depicts a schematic diagram of an example system for testing a candidate application for network compliance.

FIG. 1 depicts a schematic diagram of an example system 100 for determining network compliance with network standards. For instance, the system 100 may include a service provider network 102 comprising one or more network nodes 104 (e.g., node A 104(A), node B 104(B), node C 104(C), etc.). The one or more network nodes 104 may include a Continuous Integration and Continuous Deployment (CI/CD) node 106 for performing one or more CI/CD operations. In some examples, the CI/CD node 106 may comprise a node tracer 108, a message database 110, an onboarding rules database 112, a difference detector 114, and/or a notification generator 116. The service provider network 102 may comprise an application output log 118 for receiving output messages of a candidate application 120 executing a test run on the one or more network nodes 104 (e.g., node A 104(A), node B 104(B), node C 104(C), etc.). For instance, a third-party application vendor 122 may send and/or upload the candidate application 120 to the service provider network 102 for testing as part of a CI/CD test procedure. In some examples, the system 100 may comprise a standards reference database 124 accessible to the service provider network 102 (which may be publicly available and/or stored at the one or more network nodes 104). The system 102 may comprise a third-party operator network 126 in communication with the service provider network

102. The system 102 may comprise a graphical user interface 128 of a computing device 130 in communication with the service provider network 102. The system 102 may comprise a network operator standards database 134 for storing network operator standards, which may be defined by the operator of the service provider network 102.

In some examples, the system 100 may comprise the service provider network 102. The service provider network 102 may comprise a telecommunications network such as, a 3rd Generation Partnership Program (3GPP) network, a 3G network, a 4G network, a 4G Long Term Evolution (LTE) network, an LTE Advanced network, a 5G network, an evolved IP Multimedia System (IMS) network, and/or combinations thereof. The service provider network 102 may comprise the one or more nodes 104, any one of which may store and/or execute the CI/CD node 106. Additionally or alternatively, the CI/CD 106 may comprise a separate node from the nodes executing the candidate application 120 during the test procedure. The service provider network 102 may comprise the application output log 118 which may be stored at a database of the one or more network nodes 104 and/or at another database of the service provider network 102 and/or, in some instances, outside the service provider network 102. The third-party operator network 126 may communicate with the service provider network 102 for instance, via a Network-To-Network interface (NNI). In some examples, the service provider network 102 may communicate with the computing device 130. For instance, the computing device 130 may be associated with a user having an account, a plan, or other registration with an operator of the service provider network 102 for access to one or more services of the service provider network 102.

In some examples, the system 100 may comprise the CI/CD node 106. The CI/CD node 106 may comprise a software component or set of computer-readable instructions uploadable and/or executable at the one or more network nodes 104. The CI/CD node 106 may perform operations for testing the candidate application 120 for compliance, and generating and sending notifications indicating an occurrence of an anomalous test and/or a non-compliance of the candidate application 120 with respect to an onboarding rule of the service provider network 102. Operations of the CI/CD node 106 are discussed in greater detail below, for instance, with respect to the node tracer 108, the message database 110, the onboarding rules database 112, the difference detector 114, and the notification generator 116.

In some examples, the CI/CD node 106 may comprise the node tracer 108. Upon uploading the candidate application 120 to the service provider network 102 (e.g., at node A 104(A), node B 104(B). etc.), the node tracer 108 may perform one or more traces to identify the application output log 118 receiving messages from the candidate application 120, determine a message pathway 132 (e.g., a list of nodes comprising an end-to-end node pathway that a message of the candidate application 120 travels), and/or identify one or more messages generated by the candidate application 120 (e.g., based on a call identifier the node tracer 114 may receive upon uploading and/or beginning the testing procedure for the candidate application 120). In other words, the tracer node 108 may identify, based at least partly on the call identifier, one or more nodes and databases for receiving output messages of the candidate application 120, and identify, based at least partly on the call identifier, the one or more network nodes 104 for providing the message pathway 132 of transmission for the message.

In some examples, the CI/CD node 106 may comprise the message database 110. For instance, the message database 110 may store one or more messages generated and/or sent from the candidate application 120, for instance, as the candidate application 120 executes the test procedure at the one or more network nodes 104. The node tracer 108 may identify a location address of the messages (e.g., of the application output log 118 and/or any of the one or more network nodes 104 in the message pathway 132) and/or a destination node of the messages. As such, the node tracer 108 may identify the messages and the CI/CD node 106 may store the identified messages at the message database 110. In some examples, the message database 110 may store messages having a particular formatting corresponding to a particular node from which the message originates. The message database 110 may also store one or more indications of the particular node and/or the message pathway 132 associated with a particular message. Different types of message may have different information, and messages may be categorized according to their common characteristics and/or common standards the messages should satisfy for compliance with the onboarding rules.

In some examples, the CI/CD node 106 may comprise the onboarding rules database 112. The onboarding rules database 112 may receive and/or store one or more onboarding rules defining standards, formatting, or other requirements for messages generated by the candidate application 120 during the test procedure. In some instances, the onboarding rules database 112 may receive and/or store one or more onboarding rules comprising one or more network standards (e.g., a GSMA IR92 standard, a GSMA IR94 standard, a GSMA IR95 standard, or a Voice Over New Radio (VoNR) standard, etc.) from the standards reference database 124. The onboarding rules database 112 may store one or more rules defining formatting requirements for parts of the header specific to Request for Comments (RFC) standards.

In some instances, the onboarding rules database 112 may receive and/or store one or more onboarding rules comprising one or more network operator standards (e.g., specific to and/or defined by a particular operator of the service provider network 102). The network operator standard may be customized or particular to a new version of the candidate application 120, a particular, predetermined candidate application 120, a specific type of candidate application 120, and/or a specific third-party application vendor 122 submitting the candidate application 120. In some examples, the onboarding rules database 112 may receive the network operator standard from a non-public database of the service provider network 102 (e.g., requiring particular authentication credentials, and or security keys from the service provider network 102). The operator of the service provider network 102 may generate, customize, or define the network operator standard for the third-party application vendors 122. The network operator standard may be stored at the onboarding rules database 112 under protection of similar credentials or security keys as a database from which the network operator standard is received.

In some examples, the CI/CD node 106 may comprise the difference detector 114. The difference detector 114 may identify anomalous tests of the candidate application 120. The anomalous tests may comprise tests operating incorrectly or resulting in a file change within the CI/CD test procedure to cause a test failure. The difference detector 114 may identify one or more log messages (e.g., from the application output log 118) associated with build failures occurring while the candidate application 120 undergoes the testing procedure. The difference detector 114 may determine a plurality of hypotheses for a cause of failure associated with the CI/CD test procedure, and may prioritize, based on a confidence level analysis, the determined hypotheses by analyzing specificity weights associated with the likelihood of the file change of the CI/CD system to cause the test failure. The difference detector 114 may access and/or receive one or more messages from the message database 112 (e.g., one or more messages generated from the candidate application 120). In some instances (e.g., when the onboarding rule comprises on RFC standard such as GSMA IR94), the difference detector 114 may determine that a particular alphanumeric symbol in the message, the header of the message, a portion of the header of the message, the body of the message, a portion of the body of the message, or combinations thereof, is not a match, such as a perfect match. In other words, the difference detector 114 may flag a test as an anomalous test or a failed test by determining that one alphanumeric symbol from the message is different than the onboarding rule (e.g., an alphanumeric symbol comprising a string entry from the RFC standard). The difference detector 114 may execute a call to quantify the transcode or find other characteristics or features of the message or a portion of the message (e.g., body length, particular API calls, date formatting, predefined acronyms, security features, etc.) indicating non-compliance of the messages with respect to a particular onboarding rule. In some instance, the difference detector 114 may determine whether a network operator standard comprises an optional onboarding rule or a mandatory onboarding rule. Based on a type of onboarding rule, the difference detector 114 may flag one or more anomalous tests as non-compliant (e.g., because of non-compliance with a mandatory network operator rule) or compliant (e.g., despite non-compliance with an optional network operator rule).

In some examples, the CI/CD node 106 may comprise the notification generator 116. The notification generator 116 may generate and/or send a notification indicating the difference between the portion of the message and the onboarding rule. The notification may indicate information determined and/or outputted by the difference detector 114 and/or other components of the CI/CD node 106. The notification may indicate which message and/or a type of message caused the anomalous test, the candidate application 120 associated with the anomalous test, the third-party application vendor 122 providing the candidate application 120 associated with the anomalous test, the one or more network nodes 104 that generated and/or sent the message causing the anomalous test, and/or combinations thereof. The notification may indicate a network standard (e.g. an RFC GSMA standard) and/or a particular entry of the standard, such as a particular section and line number of the standard for which the message is non-compliant. The notification generator 116 may cause the candidate application 120 to be flagged by the CI/CD node 106. In some instances, the notification generator 116 may send the notification to the one or more network nodes 104 and/or to a device outside the service provider network 102 (e.g., the third-party operator network 126 and/or the computing device 130).

In some examples, the system 100 may comprise the application output log 118. The application output log 118 may comprise a database stored at a node (e.g., the one or more network nodes 104) of the service provider network 102. The application output log 118 may comprise a designated address for receiving output messages from applications operating on the service provider network 102, including the candidate application 120 during the test procedure. For instance, the application output log 118 may track state information associated with the one or network nodes 104 automatically by receiving duplications of messages sent between the one or more network nodes 104.

In some examples, the system 100 may comprise the candidate application 120. The candidate application 120 may comprise an application intended for operation on the one or more network nodes 104 of the service provider network 102, for instance, to provide one or more services for the service provider network 102 (e.g., a voice service, a text service, a data service, etc.). The third-party application vendor 122 may provide the candidate application 120 by uploading the candidate application onto the one or more network nodes 104, the CI/CD node 106, and/or initiating a test procedure with the CI/CD node 106. In some examples, the third-party application vendor 122 may upload the candidate application 120 via a web portal provided by the service provider network 102.

In some examples, the system 100 may comprise the standards reference database 124. The standards reference database 124 may comprise one or more databases for storing pre-established network standards. The standards reference database 124 may store RFC network standards documents defining, for instance, a GSMA IR92 standard, a GSMA IR94 standard, a GSMA IR95 standard, or a VoNR standard. The network standards stored at the standards reference database 124 may be stored as a searchable text document or other type of file such that string entries from the network standards may be indexed and/or extracted by the CI/CD node 106. In some examples, the standards reference database 124 may be publicly available, that is, stored on a publicly available database (e.g., accessible via a web portal and/or IP address) without requiring a particular security key, credentials, or authentication procedure for access.

In some examples, the system 100 may comprise the third-party operator network 126. The third-party operator network 126 may comprise another network in communication with the service provider network 102 operated by a different operator than the operator of the service provider network 102, for instance, via an NNI connection. The test procedure for the candidate application 120 may include generating one or more messages intended to be compatible with the third-party operator network 126. As such, the onboarding rules database 112 may include rules specific to compliance with network operator standards of the third-party operator network 126.

In some examples, the system 100 may comprise the computing device 130 which may include a display for rendering the graphical user interface 128. The computing device 130 may communicate with the one or more network nodes 104, for instance, via a cellular and/or internet connection. The computing device 130 may be associated with the operator of the service provider network 102 such that the operator may use the computing device 130 (e.g., and the notifications presented at the graphical user interface 128) to monitor, track, and/or take actions based on results of the test procedure performed by the CI/CD node 106. In some examples, the computing device 130 may be associated with the third-party application vendor 122, for instance, such that the third-party application vendor 122 operates the computing device 130 and receives notifications sent to the computing device 130. The computing device 130 may comprise a processor and a memory (e.g., non-transitory computer-readable storage media) for operating hardware components such as a display, monitor, screen, and/or projector for presenting notifications received at the computing device 130. In some instances, the computing device 130 may comprise a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, a television (smart television), set-top-box (STB), desktop computer.

Figure 2:
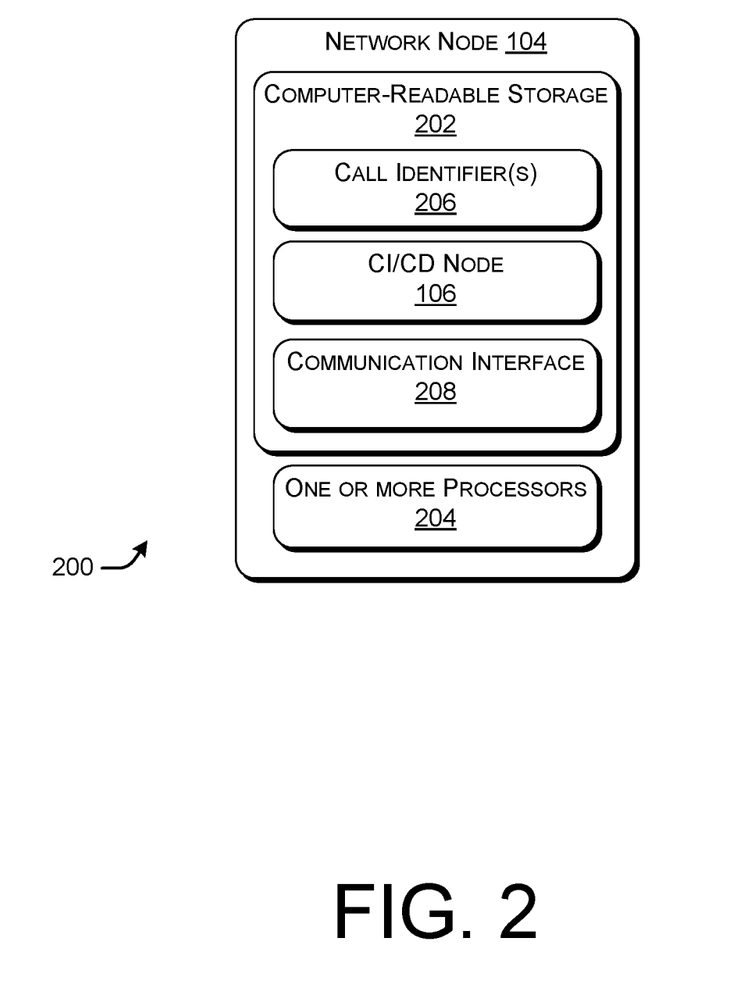
FIG. 2 depicts a schematic diagram of an example system including a network node, which may form at least a part of the systems discussed herein.

FIG. 2 depicts a schematic diagram of an example system 200 including at least the one or more network nodes 104, referred to as "the network node 104" below for ease of explanation. The network node 104 may comprise any of the nodes discussed herein.

In some instances, the network node 104 may comprise one or more computer-readable storage media 202, such as non-transitory computer-readable media including, but not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, combinations thereof, or any other medium that can be used to store information for access by a computing device. Databases and logs discussed herein, for instance stored at computer-readable storage media 202, may include one or more of a comma delimited list, a spreadsheet, an array, a NoSQL data structure, a hash-based data structure, an object-based data structure, or any other data type, data structure, and/or data system for storing retrievable data.

In some examples, the node 104 may comprise one or more processor(s) 204, such as a microprocessor, a microcomputer, a microcontroller, a digital signal processor, a central processing unit (CPU), a graphics processing unit (GPU), combinations thereof, etc. Among other capabilities, the one or more processor(s) 204 may operate to fetch and execute computer-readable instructions (i.e., software, algorithms, API calls, etc.) stored in the one or more computer-readable storage media 202, for instance, to perform the operations disclosed herein.

In some examples, the network node 104 may comprise a database storing one or more call identifiers (hereinafter referred to as "the call identifier 206"). For instance, the network node 104 may store the call identifier 206 associated with the candidate application 120 (e.g., sent to the CI/CD node 106 in response to initiating the test procedure). The call identifier 206 may comprise a string or symbol used for identifying messages generated and/or sent by the candidate application 120. For instance, the network node 104 may send one or more call messages including the call identifier to other network nodes requesting information for any messages that include a match with the call identifier 206. In this way, the network node 104 may track down the messages at the application output log 118 and/or any of the nodes in the end-to-end message pathway 132 the message travels throughout the service provider network 102 by using the call identifier 206.

In some examples, the network node 104 may comprise the CI/CD node 106 as discussed above and/or any combination of features of the CI/CD node 106 discussed above (e.g., the node tracer 108, the message database 110, the onboarding rules database 112, the difference detector 114, and/or the notification generator 116). In some examples, one or more features of the CI/CD 106 node (e.g., the node tracer 108, the message database 110, the onboarding rules database 112, the difference detector 114, and/or the notification generator 116) may be distributed among multiple network nodes (e.g., the one or more nodes 104A-C) in communication with each other. In some instances, features of the CI/CD node 106 (e.g., the node tracer 108, the message database 110, the onboarding rules database 112, the difference detector 114, and/or the notification generator 116) may be duplicated among multiple network nodes 104 for load balancing and/or redundancy.

In some examples, the network node 104 may comprise one or more communication interfaces (hereinafter referred to as "the communication interface 208"). The communication interface 208 may comprise a software (e.g., computer-readable instructions) and/or hardware (e.g., Radio Frequency (RF) transmitters) operated by the software. For instance, the communication interface 208 may comprise the NNI for communicating with the third-party operator network 126. The communication interface 208 may comprise a web portal for receiving a user input, such as from an operator of the service provider network configuring the network node 104 and/or to receive the upload of the candidate application 120 from the third-party application vendor 122. In some instances, the communication interface 208 may comprise a 3GPP network interface, (e.g., for communicating on a 4G network, a 4G Long Term Evolution (LTE) network, a LTE Advanced network, a 5G network, an evolved IP Multimedia System (IMS) network, and/or combinations thereof), such that the network node 104 may communicate with other nodes of the service provider network 102 and/or with the computing device 130, such as to cause the graphical user interface 128 of the computing device to render the notification that the candidate application 120 is not compliant with the onboarding rule.

Figure 3:
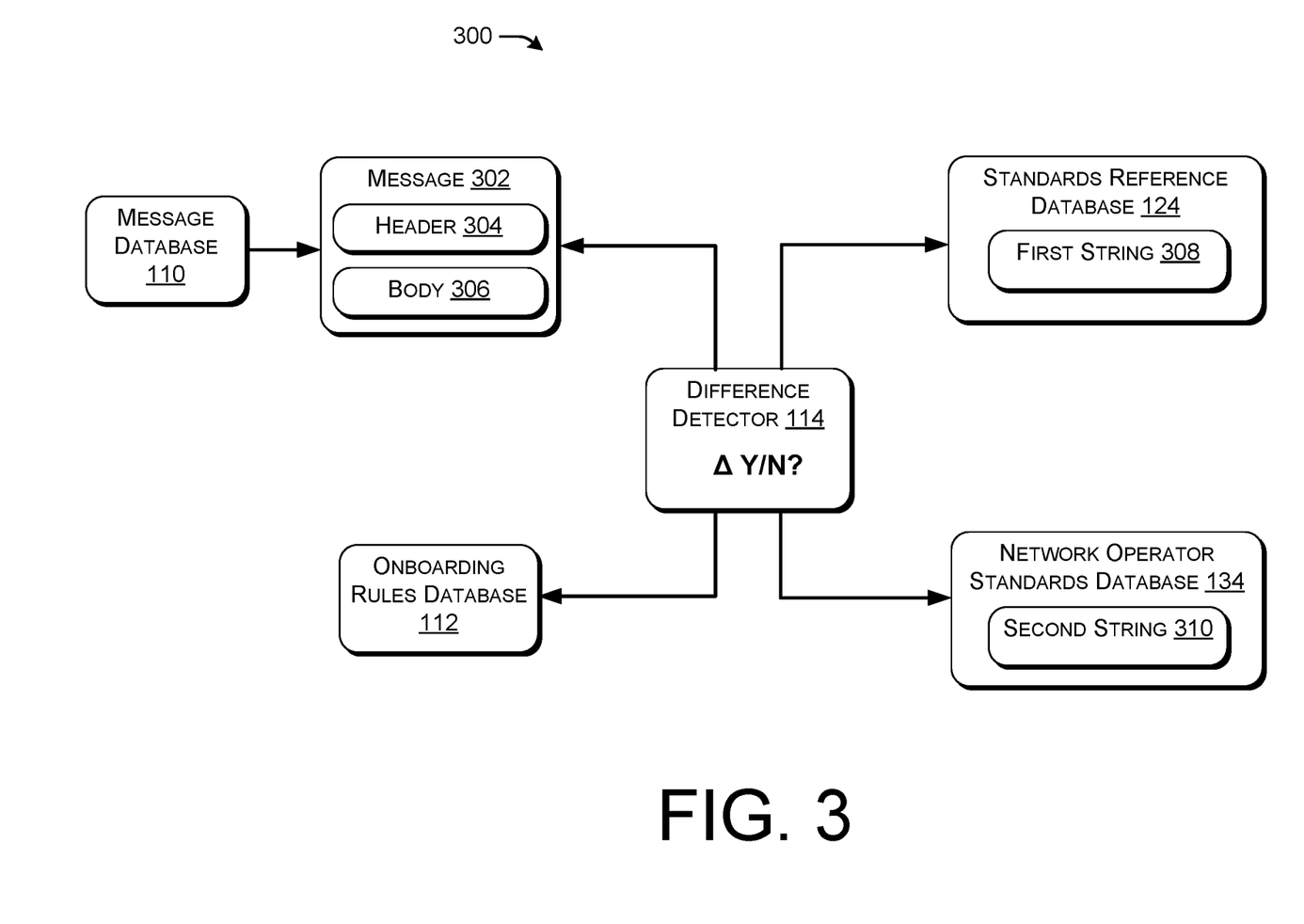
FIG. 3 depicts a schematic diagram of an example system for detecting a difference between a message and one or more network onboarding rules, which may form at least a part of the systems discussed herein.

FIG. 3 depicts a schematic diagram of an example system 300 for testing and/or deploying the candidate application 120 at the service provider network 102, which may be similar to, identical to, or may for a portion of any of the systems discussed herein. In some examples, the system 300 may include the difference detector 114 for determining whether the candidate application 120 fails the test and/or whether the test comprises an anomalous test.

The system 300 may comprise the difference detector 114 which may receive or access a message 302, for instance, from the message database 110. The difference detector 114 may compare a header 304 of the message 302 or a portion of the header 304 to a first string 308, for instance, from the standards reference database 124. The first string 308 may be from an RFC document, a GSMA document, or any standards document defining message parameters or formatting to satisfy compliance with the standard. For instance, the first string 308 may be received from section 2.2.5 of GSMA IR.92 v12.0 defining a Reason header for a SIP CANCEL request and may comprise alphanumeric symbols such as:

SIP; cause=200; text="Call completed elsewhere;"
SIP; cause=603; text="Declined;" and/or
SIP; cause=600; text="Busy Everywhere."

In some examples, the difference detector 114 may receive one or more strings from any number of different reference standard documents from any number of different standards reference databases 124, which may be distributed and/or publicly available around the world, for comparing to different portions of the message 302. In some examples, the difference detector 114 may access/receive the first string 308 from a publicly available standards reference database 124 and/or the difference detector 114 may access the first string 308 from the onboarding rules database 112, which may have previously received/stored the first string 308 from another database.

In some examples, the difference detector 114 may receive the one or more strings from the network operator standards database 134, such as the network operator standards defined by the operator of the service provider network 102. The difference detector 114 may determine a particular network operator standard to receive based on information in the message 302 (e.g., the header 304 or the body 306) and/or other information related to the message 302 (e.g., an identity of a particular third-party application vendor 122 providing the candidate application 120). In some instances, the network operator standard may define specifications for a specific software, a specific application, and/or a specific version (e.g., formatting, character limits, spelling/punctuation preferences, etc.) which may be compared against a transcoding of the message 302. The difference detector 114 may receive the second string 310 from the network operator standards database 134 and may compare the second string 310 to a portion of the message 302 (e.g., a portion of the body 306).

In some examples, the difference detector 114 may determine one or more differences between portion(s) of the message 302 and the first string 308 and/or the second string 310 of the onboarding rules. For instance, the difference detector 114 may determine that a first difference between the portion of the header 304 and the first string 308 is non-zero. That is, the first difference may comprise a single letter, number, punctuation mark, and/or other alphanumeric symbol of the portion of the header 306 (or another portion of the message 302) being different than and/or not matching the first string 308. The first string 308 may comprise a portion of an RFC network standard, such as a GSMA IR92 standard, a GSMA IR94 standard, a GSMA IR95 standard, or a VoNR standard. In some examples, the difference detector 114 may determine the second difference between a portion of the body 306 and/or the network operator standard which may indicate non-compliance with the network operator standard. In some examples, the first string 308 defining the network standard may be publicly available (e.g., requiring no security credential for access) and/or the second string 310 defining the network operator standard may be privately available, stored on the service provider network 102, not publicly available, and/or require a security credential for access. In some examples, the network operator standard (e.g., the second string 310) may define one or more characteristics (e.g., formatting characteristic) of the message 302 for complying with the network operator standard.

Figure 4:
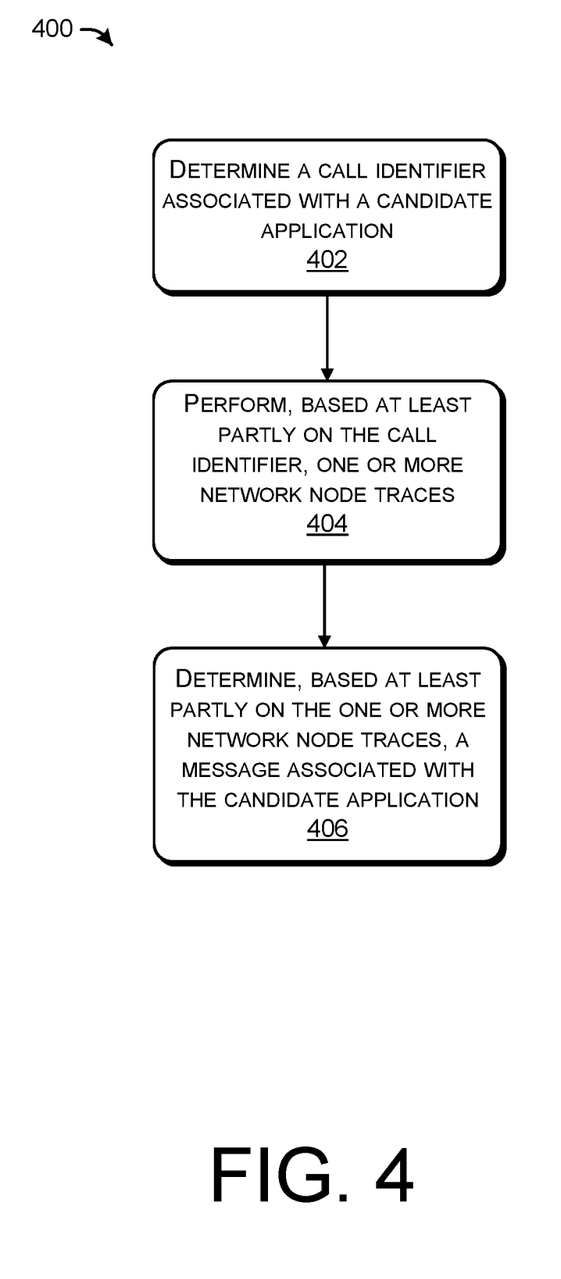
FIG. 4 depicts an example flow diagram illustrating a method including operations for determining a message for testing a candidate application for network compliance, which may be performed by the system discussed herein.

FIG. 4 depicts a flow diagram of an example method 400 for identifying the message 302 associated with the candidate application 122 as part of the testing procedure to determine if the candidate application 120 is compliant with the onboarding rule. The method 400 may be performed by any of the systems discussed herein, however, system 100 will be discussed below for ease of explanation.

At step 402 the system 100 may determine the call identifier 206 associated with the candidate application 120. For instance, the candidate application 120 may be uploaded to the service provider network 102 and may provide the call identifier 206 to the CI/CD node 106 as part of the uploading process and/or part of the test procedure. The call identifier 206 may comprise one or more alphanumeric symbols particular to the candidate application 120 that may be cross-referenced with information from the message 302 to determine if the message 302 originates from the candidate application 120.

At step 404 the system 100 may perform, based at least partly on the call identifier 206 a network node trace for the candidate application 120. For instance, upon uploading the candidate application 120 to the service provider network 102, the node tracer 108 may perform one or more traces to identify the application output log 118 receiving messages 302 from the candidate application 120, determine the message pathway 132, and/or identify the one or more messages 302 generated by the candidate application 120 (e.g., based on the call identifier 206). In other words, the tracer node 108 may identify, based at least partly on the call identifier 206, one or more node database for receiving output messages of the candidate application 120, and identify, based at least partly on the call identifier 206, the one or more network nodes 104 for providing a transmission path for the message.

At step 406 the system 100 may determine, based at least partly on the network node trace, the message 302 associated with the candidate application 120. For instance, upon identifying the message pathway 132 and/or the application output log 118, the CI/CD node 106 may receive the message 302 from a node of the message pathway 132 and/or the application output log 118. The system 100 may determine that the message 302 originates from the candidate application 120 by using the call identifier 206 associated with the candidate application 120 to identify the database storing the message 302. In some instances, the CI/CD node 106 may identify multiple different messages 302 at different nodes that are generated from different operations the candidate application 120 may perform during the test procedure.

Figure 5:
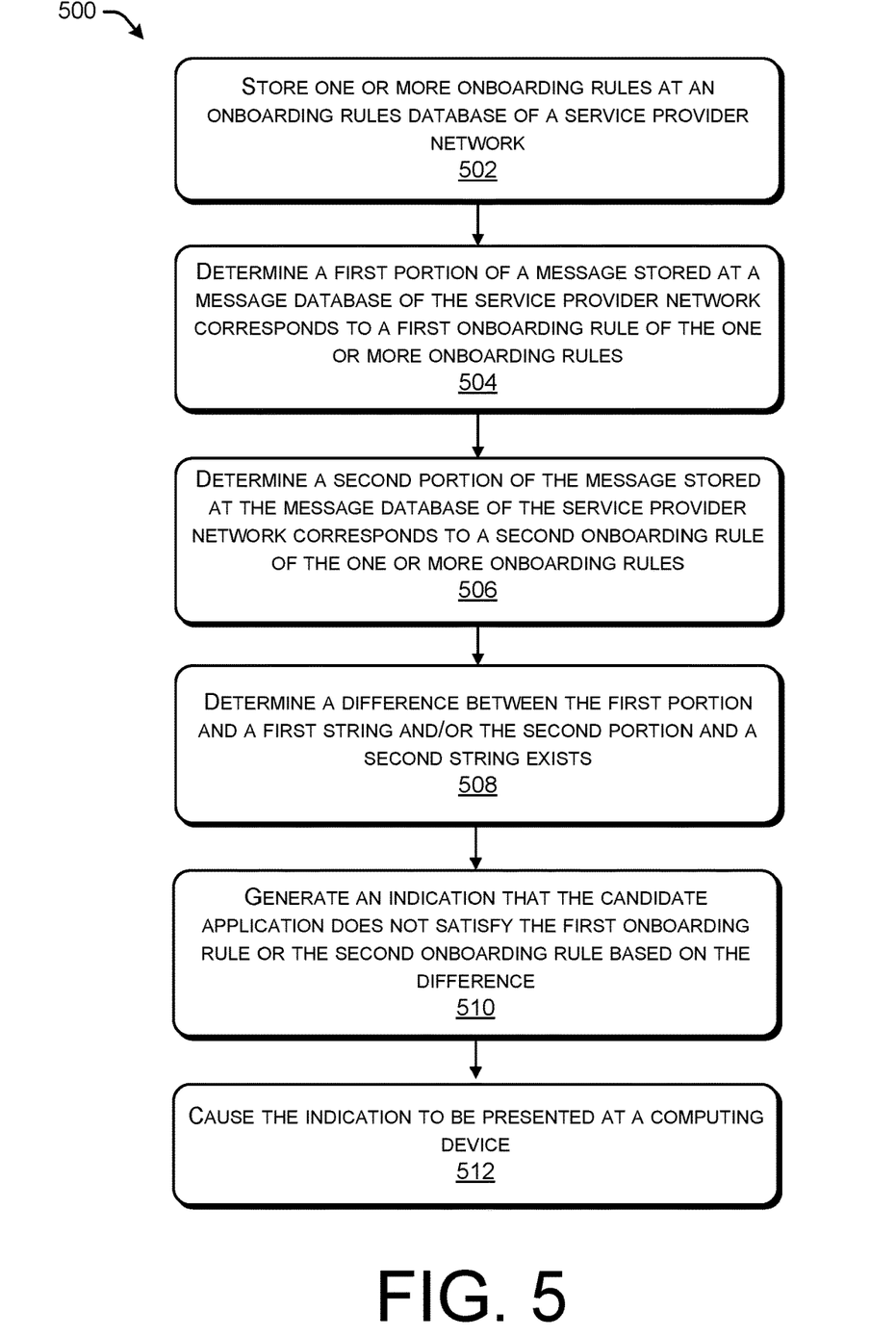
FIG. 5 depicts an example flow diagram illustrating a method including one or more operations for determining whether a candidate application satisfies one or more onboarding rules, which may be performed by the systems discussed herein.

FIG. 5 depicts a flow diagram of an example method 500 for determining whether the candidate application 120 satisfies the one or more onboarding rules. The method 500 may be performed by any systems discussed herein, however, system 100 is discussed below for ease of explanation.

At step 502, the system 100 may store one or more onboarding rules at the onboarding rules database 112 of the service provider network 102. For instance, the onboarding rules database 112 may receive and/or store onboarding rules defining standards, formatting, or other requirements for the messages 302 generated by the candidate application 120 during a test procedure. In some instances, the onboarding rules database 112 may receive and/or store one or more onboarding rules comprising one or more network standards and/or one or more network operator standards. The one or more onboarding rules may be received from publicly available databases, privately-secured databases, and/or directly via a user input provided to a web portal.

At step 504, the system 100 may determine a first portion of the message 302 stored at the message database 110 corresponds to a first onboarding rule of the one or more onboarding rules (e.g., stored at the onboarding rules database 112). For instance, the difference detector 114 may identify that the message 302 originates from a particular third-party application vendor 122 and/or the message 302 comprises a particular type of message for which a particular standard applies, and recognize that a particular standard (e.g., the GSMA IR92 standard) applies to the message 302, and/or a particular section of the standard applies to a particular portion of the message 302 (e.g., the portion of the header 304). The system 100 may identify the first string 308 from the particular standard and determine that the first portion of the message 302 corresponds to the first string

308, that is, the standard defined by the first string 308 applies to the portion of the message 302.

At step 506, the system 100 may determine a second portion of the message 302 stored at the message database 110 corresponds to a second onboarding rule of the one or more onboarding rules. For instance, the difference detector 114 may identify that a particular network operator standard (e.g., stored in the onboarding rules database 112 and/or the network operator standards database 134) applies to the body 306, a portion of the body 306, and/or other characteristics of the message 302. The second onboarding rule (e.g., network operator standard) may be a different onboarding rule/standard than the network standard applied to the first string 308 and, as such, the second string 310 may comprise a different string than the first string 308, that is, the system 100 may determine a second portion of the message 302 corresponds to a second string 310 that is a different string than the first string 308.

At step 508, the system 100 may determine a difference between the first portion and a first string and/or the second portion and a second string exists. For instance, the difference detector 114 may determine the first difference by comparing the header 304 or a portion of the header 304 to the first string 308, for instance, as defined by a standards document from the standards reference database 124. The first string 308 may be from an RFC document, a GSMA document, or any standards document defining message parameters or formatting to satisfy compliance with the standard. Additionally or alternatively, the system 100 may determine the presence of the second difference by comparing the body 306, a portion of the body 306, and/or other characteristics of the message 302 to the network operator standard to determine if, for instance, the message 302 satisfies a formatting standard that is customized/particularized to the third-party application vendor 122.

At step 510, the system 100 may generate an indication that the candidate application 120 does not satisfy the first onboarding rule and/or the second onboarding rule based on the difference (e.g., the first difference and/or the second difference). For instance, the notification generator 116 may generate the notification indicating the difference between the first portion and/or the second portion of the message 302 and the onboarding rule. The notification may indicate information determined and/or outputted by the difference detector 114 and/or other components of the CI/CD node 106. The notification may indicate which message 302 or a type of message that caused the anomalous test, the candidate application 120 associated with the anomalous test, the third-party application vendor 122 providing the candidate application 120 associated with the anomalous test, one or more network nodes 104 that generated and/or sent the message 302 causing the anomalous test, and/or combinations thereof. The notification may indicate a network standard (e.g. an RFC GSMA standard) and/or a particular entry of the standard, such as a particular section and line number of the standard for which the message is non-compliant. The notification generator 116 may cause the candidate application 120 to be flagged by the CI/CD node 106.

At step 512, the system may cause the indication to be presented at the computing device 130. For instance, the notification generator 116 may send the notification to the one or more network nodes 104 and/or to a device outside the service provider network 102 (e.g., the third-party operator network 126 and/or the computing device 130). In some examples, the service provider network 102 may cause one or more nodes 104 to send the notification to the computing device 130. The computing device 130 may be associated with testing personnel for the service provider network 102 and/or a user having an account, a plan, or other registration with the operator of the service provider network 102 for access to one or more services of the service provider network 102. The notification may provide information for resolving the issues caused by the anomalous test (e.g., which sections of the message 302 need to be fixed to match the network standard and/or network operator standard).

Although FIGS. 4 and 5 illustrate example operations, the described operations in these figures (and all other methods and operations disclosed herein) may be performed in other orders different than those illustrated in FIGS. 4 and 5 and multiple steps may be performed simultaneously or in parallel. Furthermore, in some embodiments, one or more operations illustrated in FIGS. 4 and 5 may be omitted, repeated, and/or combined with other operations illustrated in FIGS. 4 and 5, or any other operations and components discussed in this disclosure. In some instances, any of the steps 502-512 may be performed at least partly in response to any other of the steps 402-406. For example, steps 502-512 may be perform subsequent to steps 402-406, such as by using the message 302 determined at step 406 in one or more of steps 502-512. In some instances, the operations illustrated in FIGS. 4 and 5 may be performed in multiple iterations for instance, to manage hundreds, or even thousands of candidate applications 120 undergoing testing procedures on a daily basis.

CONCLUSION

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. A method comprising:
   determining a call identifier associated with a candidate application;
   performing, based at least partly on the call identifier, a network node trace for the candidate application;
   determining, based at least partly on the network node trace, a message associated with the candidate application;
   determining a first portion of the message corresponds to a first string from a standards reference;
   determining a second portion of the message corresponds to a second string from the standards reference that is a different string than the first string;
   determining a first difference between the first portion of the message and the first string or a second difference between the second portion of the message and the second string; and
   generating an indication that the candidate application does not satisfy an onboarding rule based at least partly on the first difference or the second difference.

2. The method of claim 1, further comprising determining the first difference, wherein the first string comprises a network standard based at least partly on a Request for Comments (RFC) document and the indication is based at least partly on the first difference being non-zero.

3. The method of claim 1, wherein the standards reference comprises one or more of a Global System for Mobile Communications Association (GSMA) IR92 standard, a GSMA IR94 standard, a GSMA IR95 standard, or a Voice Over New Radio (VoNR) standard.

4. The method of claim 1, further comprising determining the second difference, wherein the second string comprises a network operator standard and the indication is based at least partly on the second difference indicating non-compliance with the network operator standard.

5. The method of claim 1, wherein the first string comprises a Global System for Mobile Communications Association (GSMA) standard indicating a message header format.

6. The method of claim 1, wherein performing the network node trace comprises:
identifying, based at least partly on the call identifier, a node database for receiving output messages of the candidate application; and
identifying, based at least partly on the call identifier, one or more network nodes for providing a transmission path for the message.

7. The method of claim 1, wherein the second portion comprises customized content specific to a particular operator, and the method further comprises:
determining the second difference;
determining that the candidate application is compliant in spite of the second difference; and
causing, based at least in part on determining that the candidate application is compliant, a network node to upload the candidate application.

8. The method of claim 1, further comprising causing, based at least partly on determining the first difference or the second difference, an error message to be presented on a graphical user interface indicating that the candidate application is not compliant with a network standard.

9. A system comprising:
one or more processors; and
one or more computer-readable media storing instructions that, when executed by the one or more processors, cause the system to:
determine a call identifier associated with a candidate application;
perform, based at least partly on the call identifier, a network node trace for the candidate application;
determine, based at least partly on the network node trace, a message associated with the candidate application;
determine that a portion of the message corresponds to one or more strings from a standards reference;
determine a difference between the portion of the message and the one or more strings; and
generate an indication that the candidate application does not satisfy a network standard based at least partly on the difference.

10. The system of claim 9, wherein the one or more strings includes a first string comprising a Request for Comments (RFC) network standard and determining the difference comprises determining that one or more alphanumeric symbols in the first portion are not identical to the first string.

11. The system of claim 10, wherein the one or more strings includes a second string comprising a network operator standard and determining the difference comprises determining that the portion comprises a format that is different than the network operator standard.

12. The system of claim 9, wherein the one or more strings comprise:
a first string that is publicly available and defines a network standard; and
a second string that requires network credentials for accessing the second string form a database, the second string defining a network operator standard.

13. The system of claim 12, wherein the standards reference comprises one or more of a Global System for Mobile Communications Association (GSMA) IR92 standard, a GSMA IR94 standard, a GSMA IR95 standard, or a Voice over New Radio (VoNR) standard.

14. The system of claim 12, wherein the first string comprises a Global System for Mobile Communications Association (GSMA) standard indicating a message header format.

15. The system of claim 9, wherein performing the network node trace comprises:
identifying, based at least partly on the call identifier, a node log for receiving output messages of the candidate application; and
identifying, based at least partly on the call identifier, one or more network nodes for providing a transmission path for the message.

16. The system of claim 9, wherein the instructions, when executed by the one or more processors, further cause, based at least partly on the difference, an error message to be presented at a graphical user interface indicating that the candidate application is not compliant with an onboarding rule.

17. A network node comprising:
one or more processors; and
one or more computer-readable media storing instructions that, when executed by the one or more processors, cause the network node to:
receive a message associated with a candidate application being assessed for deployment;
determining a call identifier associated with the candidate application;
identifying, based at least partly on the call identifier, a node log for receiving output messages of the candidate application, wherein the message is received from the node log;
receive, from a standards reference, a string defining a network standard;
determine a difference between a portion of the message and the string; and
generate an indication that the candidate application does not satisfy the network standard based at least partly on the difference.

18. The network node of claim 17, wherein the network standard comprises Global System for Mobile Communications Association (GSMA) standard indicating a message header format and the portion of the message comprises a message header.

19. The network node of claim 17, wherein the instructions, when executed by the one or more processors, further cause, based at least partly on the difference, an error message to be presented on a graphical user interface indicating that the candidate application is not compliant with an onboarding rule.

20. The network node of claim 17, wherein the standards reference comprises one or more of a Global System for Mobile Communications Association (GSMA) IR92 standard, a GSMA IR94 standard, a GSMA IR95 standard, or a Voice over New Radio (VoNR) standard.

* * * * *